US005771578A

United States Patent [19]

King, Jr. et al.

[11] Patent Number: 5,771,578

[45] Date of Patent: Jun. 30, 1998

[54] METHOD AND APPARATUS FOR MAKING SEALANT CONTAINING WIRE CONNECTORS

[75] Inventors: L. Herbert King, Jr., Town & Country; Kerry Graham, New Florence; Douglas L. Kirk, Ballwin, all of Mo.

[73] Assignee: King Technology of Missouri, Inc., St. Charles, Mo.

[21] Appl. No.: 717,460

[22] Filed: Sep. 20, 1996

[51] Int. Cl.[6] .............................. H01R 43/16; H02G 1/12

[52] U.S. Cl. ............................. 29/885; 29/564.1; 29/593; 356/372; 356/379

[58] Field of Search .......................... 29/885, 593, 564.1; 427/10; 356/379, 372

[56] References Cited

U.S. PATENT DOCUMENTS 4,935,261 6/1990 Srivastava et al. ....................... 427/10
5,023,402 6/1991 King, Jr. et al. .
5,113,037 5/1992 King, Jr. et al. .
5,151,239 9/1992 King, Jr. .
5,418,331 5/1995 Delalle .
5,426,130 6/1995 Thurber et al. .......................... 522/14

*Primary Examiner*—Carl J. Arbes
*Attorney, Agent, or Firm*—Jacobson & Johnson

[57] ABSTRACT

A system and method for automatically assembling capped, sealant containing, twist-on wire connectors with the system interruptible if the components are not available for assembly, but allowing for the carrying of faultily assembled components through the assembly process without further assembly thereon, so that the improperly assembled components can be delivered to the proper recycling bin to assure that only the properly assembled capped, sealant containing, twist-on wire connectors are sent to packaging for shipment to a customer.

17 Claims, 4 Drawing Sheets

METHOD AND APPARATUS FOR MAKING SEALANT CONTAINING WIRE CONNECTORS

FIELD OF THE INVENTION

This invention relates generally to the manufacture of twist-on wire connectors, and more specifically, to the automated assembly of capped, sealant containing, twist-on wire connectors.

BACKGROUND OF THE INVENTION

The process of manufacturing a sealant containing twist-on wire connector involves numerous steps, as the wire coil must be inserted into the twist-on connector shell and than filled with sealant and capped. As twist-on wire connectors are relatively small, numerous problems can occur during the assembly of the capped, sealant containing, twist-on wire connectors. The present invention provides a process and system that automatically produces a capped, sealant containing, twist-on wire connector, and includes a monitoring system for sending a fault signal to a controller to either interrupt the process if components are not available or to send a fault signal to interrupt further processing of the faultily assembled part. The system continues to carry a faultily assembled part until such time that the faultily assembled part can be directed to a recycle bin, thus allowing the continuation of the assembly cycle even though one of the parts being processed might be faultily assembled. The system ensures the integrity and quality of the assembled twist-on wire connectors by sensing and directing faultily assembled wire connectors to the proper recycling bin, while the properly assembled wire connectors are sent to a packaging unit for shipment to a customer.

BRIEF DESCRIPTION OF THE PRIOR ART

U.S. Pat. No. 5,113,037 shows a capped, sealant containing, twist-on wire connector;

U.S. Pat. No. 5,151,239 shows a capped, sealant containing, twist-on wire connector; and U.S. Pat. No. 5,023,402 shows a capped, sealant containing, twist-on wire connector.

SUMMARY OF THE INVENTION

This invention comprises a system and method for continuous manufacture of a capped, sealant containing, twist-on wire connector, wherein the process is interrupted if a component is not available for assembly, but allows for the assembly process to continue if a capped, sealant containing, twist-on wire connector is faultily assembled. A controller identifies the reason for the faultily assembled twist-on wire connector, and directs the faultily assembled twist-on wire connector to an appropriate rejection or recycling bin.

DESCRIPTION OF THE PREFERRED EMBODIMENT

Figure 1:
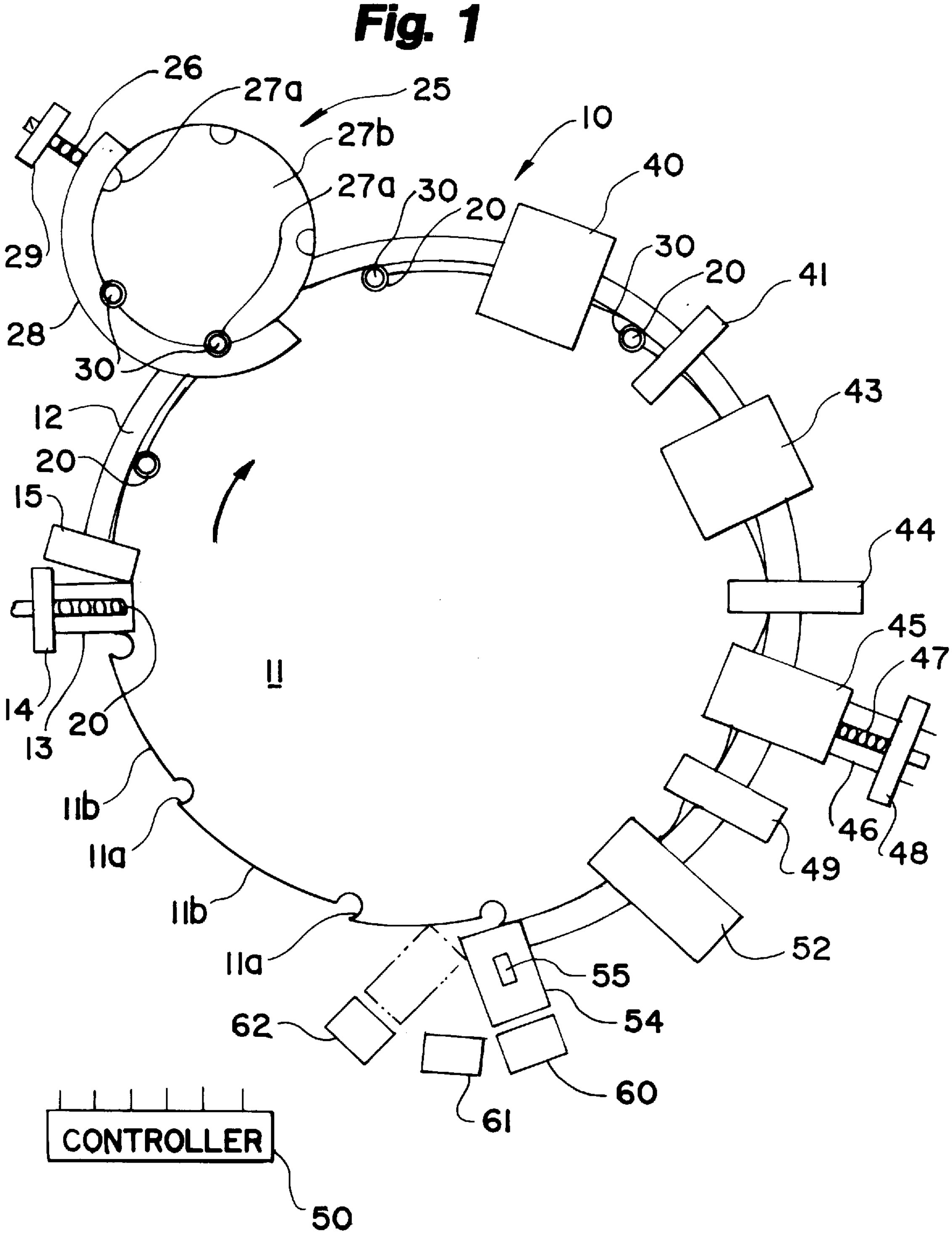
FIG. 1 is a top, partial schematic view of the apparatus for automatically assembling capped sealant containing twist-on wire connectors.

Referring to FIG. 1, reference numeral 10 identifies a system for the manufacture of a capped, sealant containing, twist-on wire connector. System 10 includes a rotating table 11, having a series of circular slots 11*a* spaced along the periphery of table 11. The table has a tapered lead in region 11*b* that extends from the outer periphery of the table to the radial slot 11*a*. A shell feeder 13 directs empty twist-on wire connector shells 20 to the slots 11*a* on the periphery of table 11, where the shells are picked from the shell feeder by slot 11*a*. Shells 20 are shown in shell feeder 13, with an optical sensor 14 positioned along shell feeder 13 to determine if shells are being fed into the radial slots of the periphery of table 11. If no shells are being sent to shell feeder 13, an interrupt signal is sent to controller 50 to alert the operator that the shell feeder 13 is malfunctioning, and to stop the assembly process until shells are being fed into the rotary table 11. If the shells 20 are being properly fed in shell feeder 13, no signal is sent to controller 50.

Figure 7:
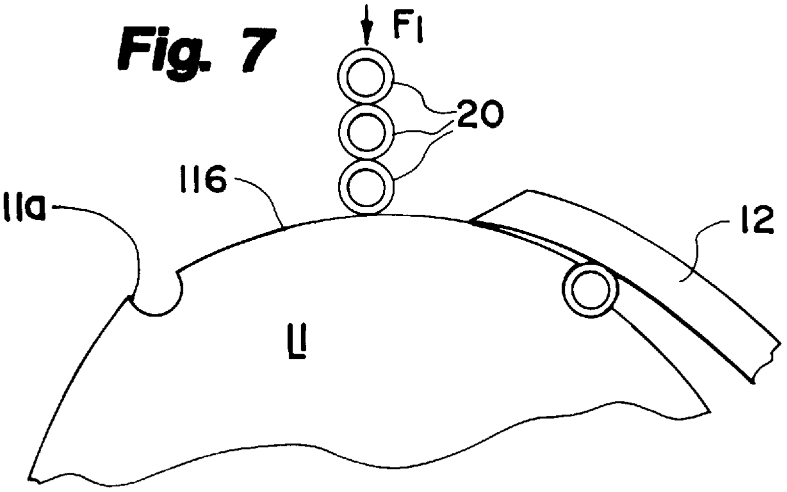
FIG. 7 shows a partial schematic view of the rotary table as it is about to pick a twist-on wire connector shell from a feeder containing twist-on wire connector shells.
Figure 8:
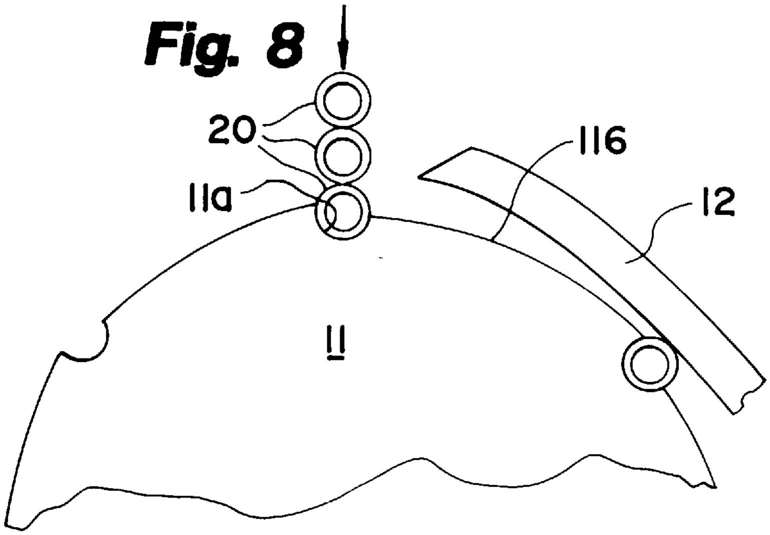
FIG. 8 shows the partial schematic view of the rotary table after it has picked a twist-on wire connector shell from a feeder containing twist-on wire connector shells.

FIG. 7 shows a portion of rotating table 11 with a schematic illustrating how shells 20 are picked from a row of shells. That is, a force F1 pushes shells 20 towards table 11, allowing the shells 20 to slide along surface 11*b*. FIG. 8 shows the shell 20 continues to slide along surface 11*b* until the shell is pushed into slot 11*a*. Once the shell is in slot 11*a*, the slot picks the shell 20 from the row of shells and moves the shell to the right, where the arm 12 engages the outside of shell 20 and table 11 to hold the shell 20 in the peripheral slot 11*a* for further processing.

Located next to shell feeder 13 is a second optical sensor that senses if shell 20 is properly positioned in radial slot 11*a*. If shell 20 is properly positioned and free of defects, the assembly process of the capped, sealant containing, twist-on wire connector continues. If the shell is not properly positioned or free of defaults, the optical sensor 15 sends a signal to controller 50 that directs a signal to further work stations to prevent further assembly on the improperly positioned shell or faulty shell.

Table 11 continues to rotate and holds shell 20 in slot 11*a* with a peripheral guide 12 that extends partially around table 11. Continued rotation of table 11 brings shell 20 to a wire coil feeding station 25 which includes a wire coil feeder 26 and an optical sensor 27 to determine if the wire coils are being supplied to wire coil feeding station 25. An optical sensor 29 senses if a wire coil is being fed to the rotating table 11, and sends a fault signal to the controller 50 if the wire coil is not being fed to the rotating coil feeder 27. Rotating coil feeder 27 is similar to rotating table 11 and includes a smaller rotating head 27*b* with a guide 28 located adjacent a portion of head 27 to hold the wire coil in head 27*b*. Controller 50 interrupts the assembly process if no wire coil is being sent in coil feeder 26. Head 27*b* includes chambers 27*a* for holding wire coils 30 prior to positioning the wire coils over shells 20. Once positioned over shell 20, an ejector (not shown) directs the wire coil into the cavity of shell 20. The wire coil 30 and shell 20 are than sent to station 40 that directs a plunger 80 downward to force wire coil 30 into proper engagement with shell 20.

Figure 2:
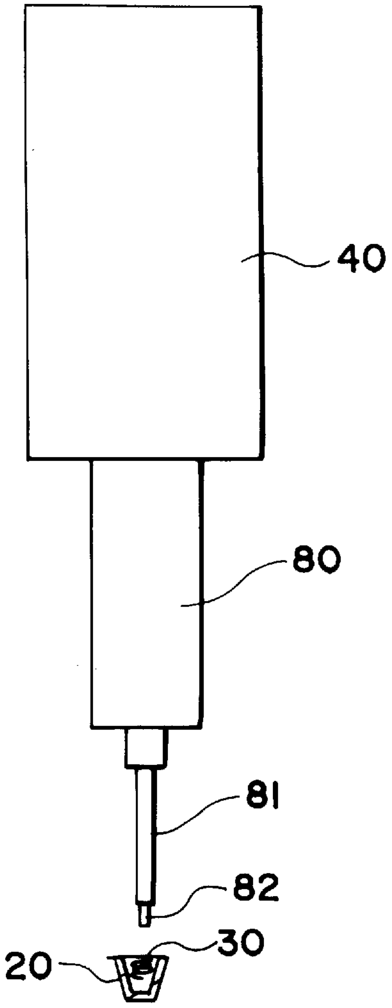
FIG. 2 shows a front view, partially in section, of a tool for forcing a wire coil into engagement with the twist-on wire connector shell.
Figure 2A:
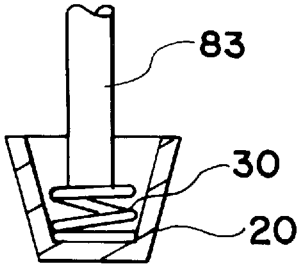
FIG. 2A shows the tip of the tool of FIG. 2 forcing the wire coil into the twist-on wire connector shell.
Figure 2B:
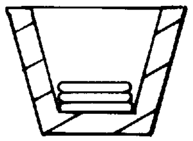
FIG. 2B shows a cross-sectional view of the wire coil, with the wire coil in engagement with the twist-on wire connector shell.

FIG. 2 shows a partial schematic view of plunger tool 80 that forces wire coil 30 into sheet 20. The tool 81 for directing the wire coil into shell 20 includes a cylindrical rod 81 with a smaller cylindrical tip 82 for fitting into the opening in the top of wire coil 30. FIG. 2 illustrates the tool prior to forcing of the wire coil 30 into shell 20. FIG. 2A illustrates how tool 83 has been extended downward so the tip of tool 82 is within coil 30 to function as a guide for the wire coil. The continued pushing downward on tool 82 drives wire coil 30 into engagement with the bottom of shell 20 as shown in FIG. 2B. In this condition, the assembly process can continue.

Located adjacent to station 40 is a further optical sensor 41 that determines if the wire coil 30 is properly positioned in shell 20 and sends a fault signal to controller 20 if the coil 30 is not properly engaged in shell 20. Even though wire coil 30 may not be properly positioned, the processing of other shells and coils in the table is allowed to proceed, but further processing of the improperly or faultily assembled wire coil and shell is terminated, with the wire coil and shell continuing on the table until they are directed to a bin for recycling.

If coil 30 and shell 20 are in proper engagement, a sealant dispensing device 43 directs a viscous sealant into the cavity in the wire coil 30. The sealant containing coil 30 and shell 20 continue on to an optical sensor 44 that determines if the sealant has been dispensed into the cavity in the wire coil. Sensor 44 optically senses if the sealant is in the cavity of the wire coil 30, and sends a fault signal to a controller 50 if the sealant is not in the cavity. Controller 50 directs a signal to the remaining processing stations to prevent further assembly of the defective components but allows the defective components to continue until the faulty components can be discharged into a recycle bin 60, 61 or 62.

Figure 3A:
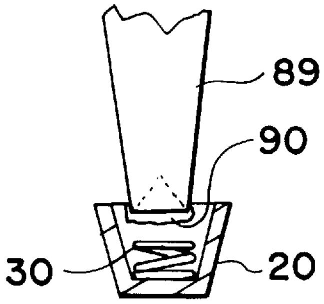
FIG. 3A shows the tip of the sealant delivery device of FIG. 3 directing sealant into the twist-on wire connector shell.
Figure 3:
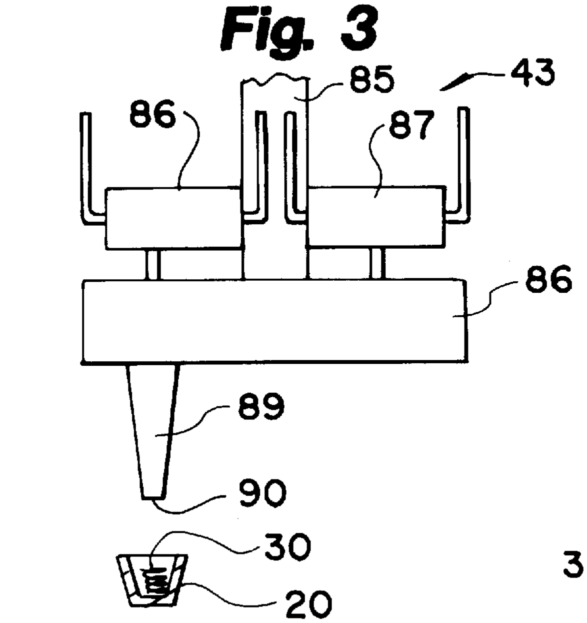
FIG. 3 shows a front view of a sealant delivery device for directing sealant into a twist-on wire connector shell.

FIG. 3 shows a partial schematic and partial front view of sealant dispensing device 30, comprising a shaft 85 for raising and lowering head 88 with the sealant supply valves 86 and 87. The device is shown with a single sealant injector tube 89 for directing sealant 90 into the wire coil 30 in shell 20. In some applications, particularly for larger shells one could place a second sealant injection tube on head 88 so that the shells could be filled in two separate steps rather than one step.

FIG. 3A illustrates how sealant injection tube 89 is lowered into shell 20 and sealant 90 is being injected into the wire coil 30 in shell 20.

Figure 3B:
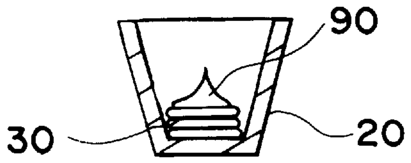
FIG. 3*b* shows the twist-on wire connector shell filled with sealant.

FIG. 3B shows a partial cross sectional view of twist-on wire connector shell 20 with a sealant 90 located in shell 20. FIGS. 3, 3A and 3B are intended to illustrate how shell 20 would appear as it is processed through the sealant dispensing station 30.

After optical sensor 44 determines if the wire coil has been properly filled with sealant, and that the twist-on wire connector shell, wire coil, and sealant are in a condition for further assembly, the sealant containing wire connector shell 20 continues on to a cap station 45.

Cap station 45 includes a cap feeder trough 46 and caps 47 positioned in the trough 46. An optical sensor 48 determines if the caps 47 are being delivered to cap station 45. If no caps are being delivered to cap station 45, the optical sensor 48 sends a signal to controller 50.

Controller 50 interrupts the assembly process until caps 47 can be fed into cap feeding station 45.

Figure 4:
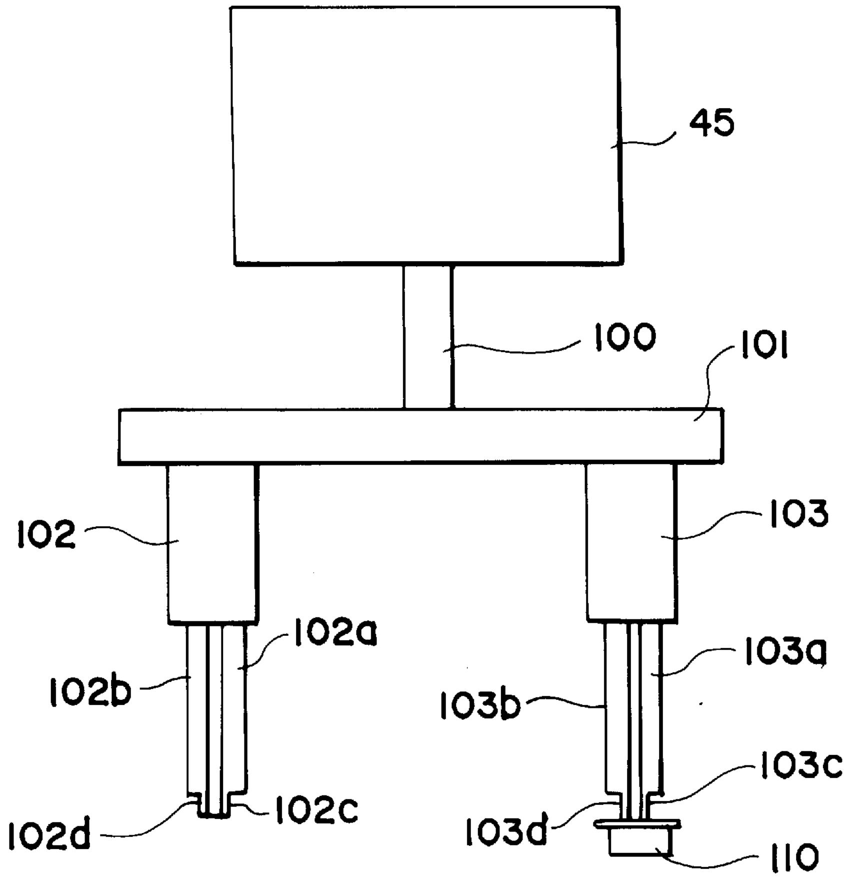
FIG. 4 shows a pick and place device for placing a cap on a twist-on wire connector shell.

FIG. 4 shows a partial schematic and front view of cap applicator 45 which includes a shaft 100 that is movable up and down as well as rotatable. Attached to shaft 100 is a head 101 that includes a first cap pick and place device 102 and a second cap pick and place device 103. Pick and place device 102 includes a first member 102 having a tip 102*b* of a first dimension and a second member 102*a* having a tip 102*c* of smaller dimension with the tips having a curved surface for frictionally engaging a cap. Similarly, pick and place device 103 includes a first member 103 having a tip 103*b* of a first dimension and a second member 103*a* having a tip 103*c* of smaller dimension with the tips having a curved surface for frictionally engaging a cap 110.

Figure 5:
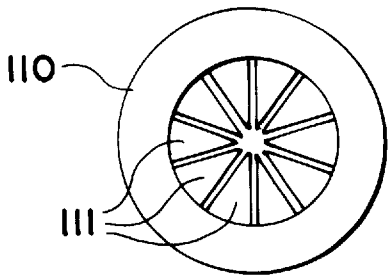
FIG. 5 shows a top view of a cap for placing on a twist-on wire connector shell.
Figure 6:
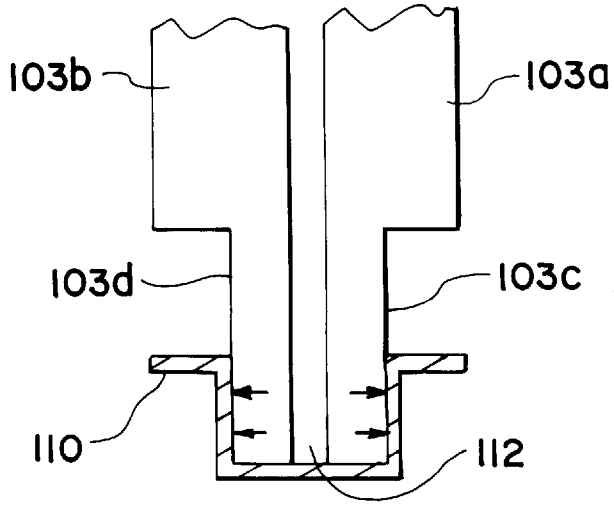
FIG. 6 shows the tool tip on the pick and place device of FIG. 4, with the tool frictionally holding the cap therein.

FIG. 5 shows a top view of cap 110 with segments 11 located thereon. Cap 110 is shown in a cross-sectional view in FIG. 6, with the tool tips 103*d* and 103*c* being forced radially outward to engage the inner peripheral region 112 of cap 110. The frictional engagement of cap 110 by the outward movement of members 103*d* and 103*c* is sufficient to allow cap 110 to be picked from the feeder line 46 and placed on a shell of a twist on wire connector. To release the cap, the members 103*d* and 103*c* are moved radially inward thus allowing the cap 110 to be left on the shell in the rotating table.

After installation of cap 47 on shell 20, a further optical sensor 49 determines if the cap is properly positioned on shell 20. If the shell and cap are properly assembled, no fault signal is sent to controller 50, however, if the cap and shell are not properly assembled, a fault signal is sent to controller 50. Controller 50 prevents further processing of the faultily assembled cap and shell but allows the cap and shell to continue on to the recycle bins 60, 61 and 62.

If the cap and shell are in proper position, a suction member in station 52 pulls cap and shell 20 from the radial slot 11*a* and delivers the assembled twist-on wire connectors and shell to an area for packaging and shipping to a customer. The twist-on wire connectors that were not properly assembled are directed to either bin 60, 61 or 62 by a pivotable chute 54. Pivotable chute 54 is shown directing an improperly assembled wire connector to bin 60. The bins 60, 61 and 62 receive improperly assembled twist-on wire connectors in accordance with the fault in the assembly process. For example, if a twist-on wire connector shell and wire coil did not properly engage, the controller would position chute to direct the wire coil and shell to bin 60. If the connector shell was not properly filled with sealant, the controller would position chute 54 to direct the faultily assembled connector to bin 61. If the connector shell and cap were not properly positioned, the controller 50 would position chute 54 to direct the faultily assembled connector to bin 62.

Thus the system of the present provides for the automatically assembly of shell, wire coil, sealant and cap. Only if one of the components is not present is the system stopped to insure that the other components are present in the system. In the event of a faultily assembly, the processing is stopped on the faultily assembled components, but controller 50 allows the faultily assembled unit to continue on the rotating table, and when the rotating table reaches the discharge chute 54, the controller pivots the chute 54 to direct the faultily assembled wire connector to the proper recycling bin.

We claim:

1. A method for assembling a capped, sealant containing, twist-on wire connector comprising the steps of: determining if a plurality of capped, sealant containing, twist-on wire connector components are available for assembling and interrupting the assembly process until the components are available for assembly, but continuing the assembly process if components are faultily assembled, but segregating the faultily assembled components from the properly assembled components so that only the properly assembled components are available for packaging and delivery to a customer.

2. The method of claim 1 including the step of optically sensing if the components are available for assembly.

3. The method of claim 1 including the step of optically sensing if the components are properly assembled and sending a signal to a controller in response to an improperly assembled wire connector.

4. The method of claim 1 including the step of directing a sealant into a wire coil located in a twist-on, wire connector shell.

5. The method of claim 1 including the step of placing a cap on a sealant containing, twist-on, wire connector shell.

6. The method of claim 1 including the step of directing a faultily assembled wire connector to a recycle bin in accordance with the type of faultily assembly.

7. The method of claim 1 including the step of optically sensing if a cap has been placed on a wire connector shell.

8. The method of claim 1 including the step of directing an improperly assembled wire connector to a recycling bin in accordance with the type of improper assembly.

9. The method of claim 1 including the step of placing the wire connector shells in a recess in a periphery of a rotatable table.

10. A method for manufacture of a capped, sealant containing, twist-on wire connector, comprising the steps of:

optically sensing if a shell is being fed to a rotating table and sending a fault signal to a controller if the shell is not being sent to the rotating table;

directing the shell into a radial slot in the periphery of a rotating table;

optically inspecting the shell to determine if the shell is properly positioned in the periphery of the rotating table and sending a fault signal to a controller if the shell is not properly positioned in the rotating table;

optically sensing if a wire coil is being fed to the rotating table and sending a fault signal if the wire coil is not being sent to the rotating table;

directing a wire coil into a cavity of the shell in the rotating table;

forcing the wire coil into engagement with the shell;

optically sensing if the wire coil is in engagement with the shell and sending a fault signal to a controller if the wire coil is not in proper engagement with the shell;

directing a viscous sealant into a cavity in the wire coil;

optically sensing if the sealant is in the cavity of the wire coil and sending a fault signal to a controller if the sealant is not in the cavity;

optically sensing if a cap is being directed to the rotating table and sending a fault signal to a controller if the cap is not being directed to the rotating table;

placing the cap on the shell in the rotating table;

optically sensing if cap is properly positioned on the shell and sending a fault signal to a controller if the cap is not properly positioned on the shell; and directing any shells with properly positioned caps to packaging for shipment to a customer; and directing any shells which generated fault signals into a reject bin for further processing.

11. An apparatus for assembly of a capped, sealant containing, twist-on wire connector comprising:

a moveable table;

a shell feeder for directing an empty shell into a slot in the moveable table;

a wire coil feeder for directing a wire coil into a shell in the moveable table;

a sealant dispenser for directing sealant into a cavity in the wire coil in the shell; and a cap dispenser for placing a cap on the shell of the wire connector containing a wire coil and a sealant to provide a capped, sealant containing, twist-on wire connector.

12. The apparatus of claim 11 including a first optical sensor for determining if the shells are being supplied to the rotatable table.

13. The apparatus of claim 12 including a second optical sensor for determining if the sealant has been properly placed into the wire connector shell.

14. The apparatus of claim 11 including a controller for directing a faultily assembled wire connector to a recycling bin and a properly assembled twist-on wire connector to a packaging area for delivery to a customer.

15. The apparatus of claim 11 including a plurality of discharge bins for receiving faultily assembled twist-on wire connectors in accordance with the type of faultily assembly.

16. The apparatus of claim 11 wherein the moveable table is round and includes peripheral recesses for receiving twist-on wire connector shells.

17. The apparatus of claim 11 including a second moveable table for directing a wire coil on to the moveable table for holding the wire connector shells.

* * * * *